Nov. 22, 1927.  1,649,869

P. STONE

INTERNAL COMBUSTION ENGINE

Filed Oct. 14, 1925   5 Sheets-Sheet 1

INVENTOR.
PETER STONE
BY Stuart C. Barnes
ATTORNEY.

Nov. 22, 1927.

P. STONE 1,649,869

INTERNAL COMBUSTION ENGINE

Filed Oct. 14, 1925

INVENTOR.
PETER STONE

Stuart C. Barnes
ATTORNEY.

Nov. 22, 1927.
P. STONE
1,649,869
INTERNAL COMBUSTION ENGINE
Filed Oct. 14. 1925    5 Sheets-Sheet 4
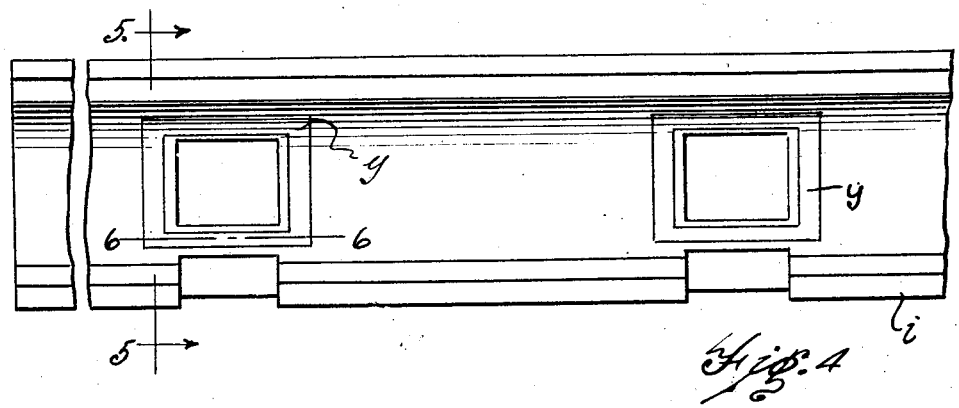
Fig. 4
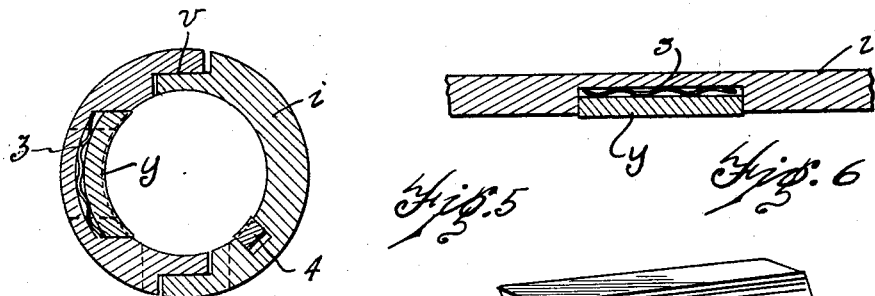
Fig. 5    Fig. 6
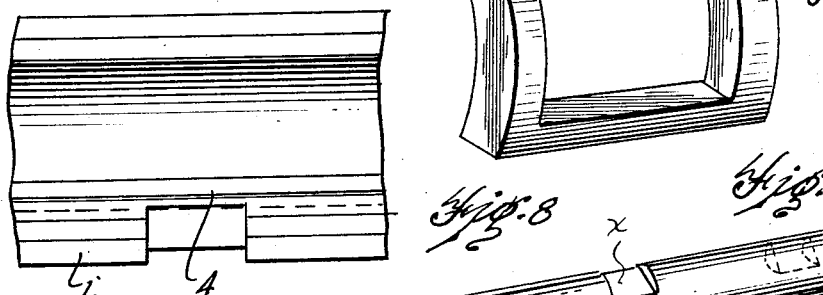
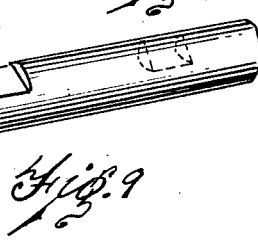
Fig. 8    Fig. 7
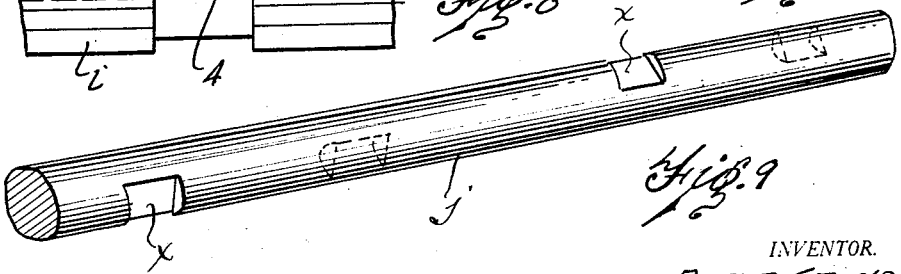
Fig. 9
INVENTOR.
PETER STONE
BY
ATTORNEY.

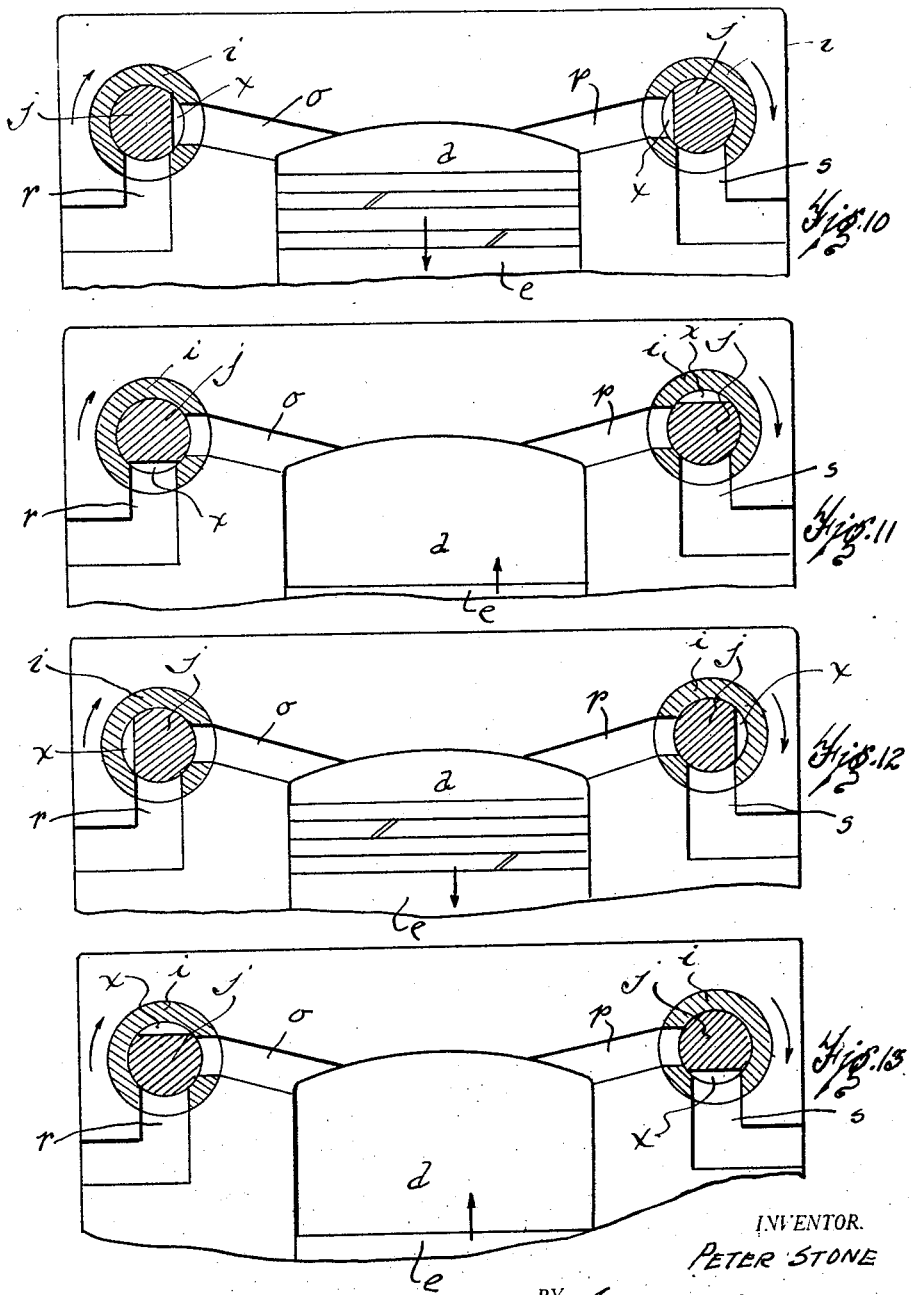

Patented Nov. 22, 1927.

1,649,869

UNITED STATES PATENT OFFICE.

PETER STONE, OF DETROIT, MICHIGAN.

INTERNAL-COMBUSTION ENGINE.

Application filed October 14, 1925. Serial No. 62,355.

This invention relates to an internal combustion engine, and has for its object a simplified valve construction, thereby eliminating many of the parts necessary in the present day tappet valve construction.

My construction, being easily assembled and having fewer parts, is more cheaply manufactured and it enables the manufacturer to considerably increase his production. Furthermore, in the operation of such an engine there are fewer parts to wear out, thereby decreasing the maintenance cost and producing an engine which will last considerably longer than the present day engine.

In the drawings:

Fig. 4 is a detailed inside elevational view of part of one of the halves forming the valve sleeve.

Fig. 5 is a section taken on the line 5—5 of Fig. 4, showing the two halves which form a valve sleeve assembled together.

Fig. 6 is a section on the line 6—6 of Fig. 4.

Fig. 7 is a detailed perspective view of the packing ring.

Fig. 8 is a detailed inside elevation of a portion of the semi-sleeve complementary to that illustrated in Fig. 4.

Fig. 9 is a perspective view of a portion of the valve member.

Figs. 10 to 13 inclusive are detailed diagrammatic views showing the different positions of the valve.

$a$ designates the engine block, $b$ the cylinder head arranged to be bolted to the engine block, and $c$ designates the water jacket about the cylinders $d$. Reciprocating in these cylinders are the usual pistons $e$ connected to the crank shaft $f$ by the connecting rods $g$. So far this is the usual form of construction in any type of internal combustion engine.

Figure 1:
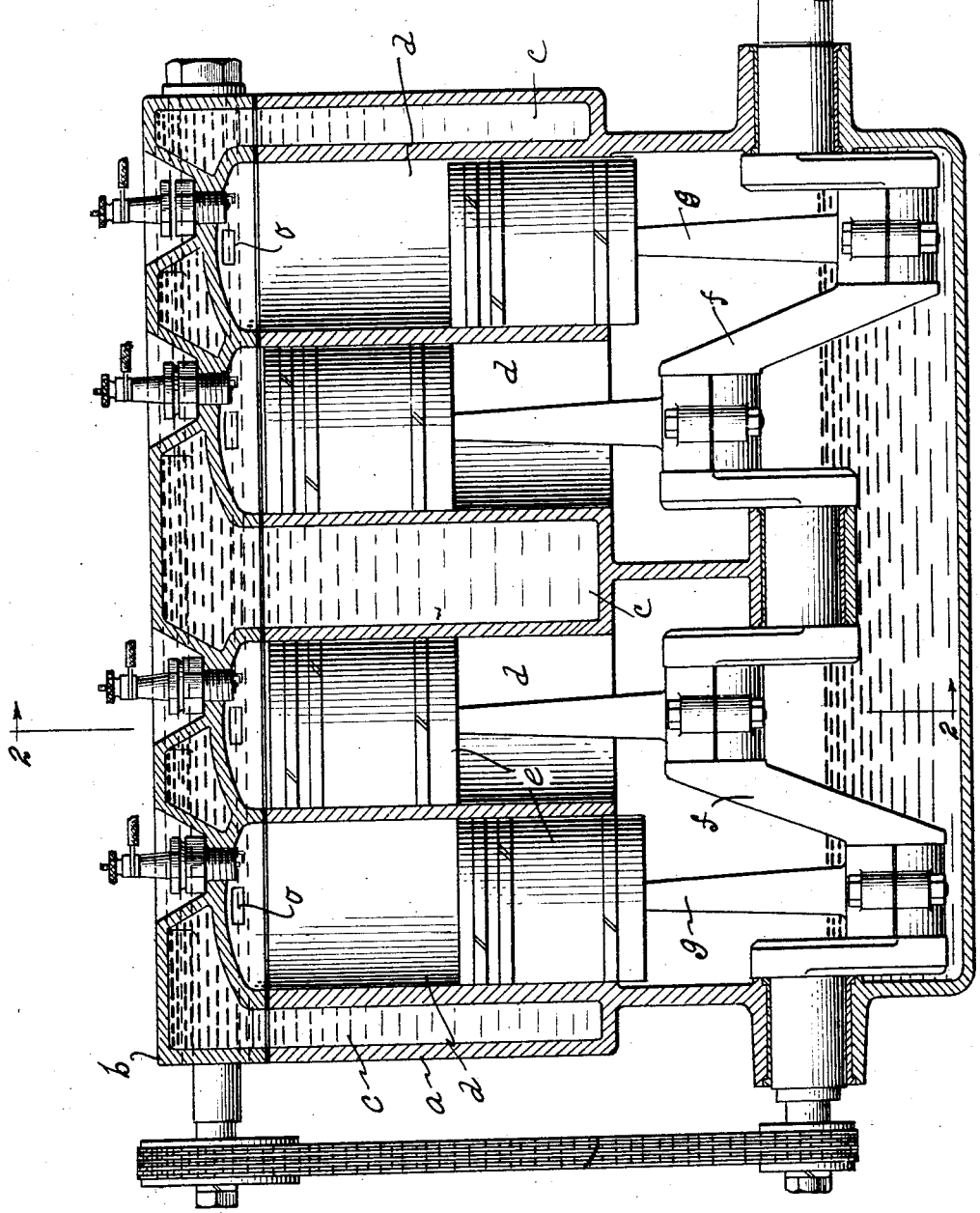
Fig. 1 is a vertical longitudinal sectional view through an internal combustion engine, showing my improved valve construction.
Figure 2:
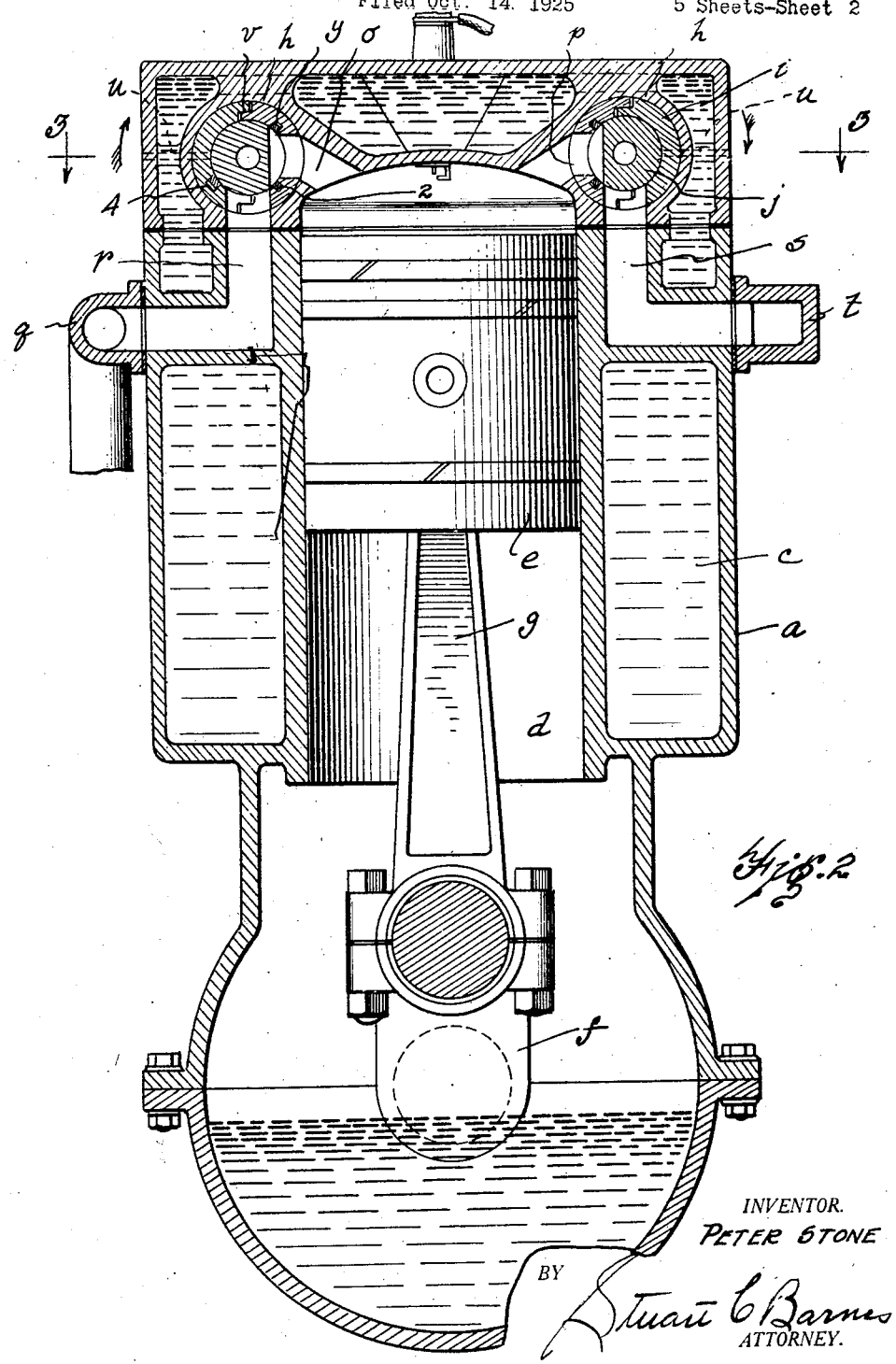
Fig. 2 is a vertical transverse section therethrough, taken on the line 2—2 of Fig. 1.
Figure 3:
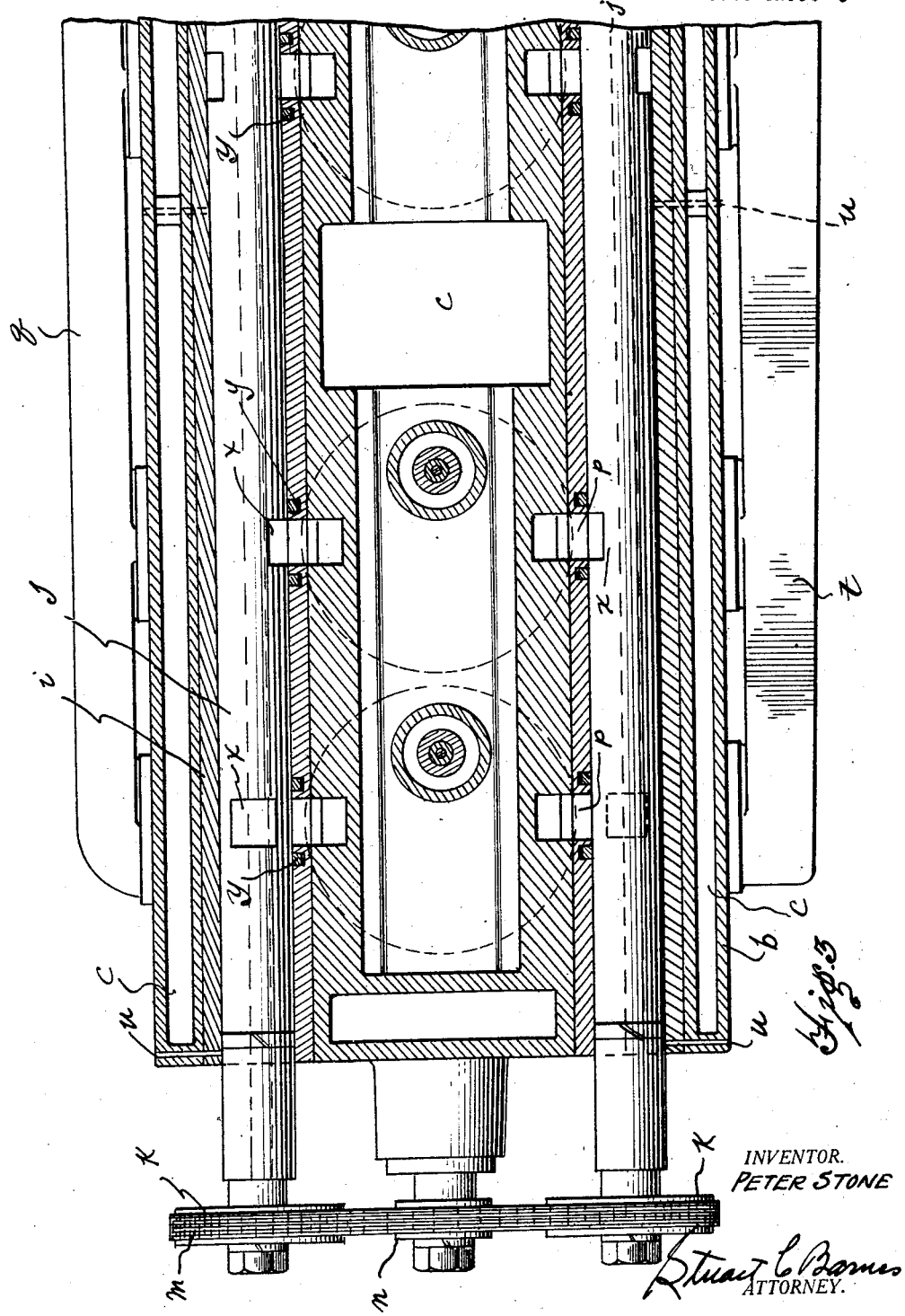
Fig. 3 is a partial horizontal section taken substantially on the line 3—3 of Fig. 2.

The cylinder head is bored out as at $h$ and fitted within this longitudinal bored out recess is a two part valve sleeve $i$, and rotatably supported in the valve sleeve is a valve shaft $j$. Fig. 3 shows a general arrangement of this valve sleeve and valve member, the valve member being extended beyond the end of the engine block and provided with the sprocket wheel $k$, and a chain $m$ runs about these sprocket wheels and over a drive sprocket wheel $n$ carried on the crank shaft. There is a suitable reduction in the speed of the valve member relative to the crank shaft speed and I preferably run the valve member at half the speed as the crank shaft.

I have provided the intake ports $o$ opening into each cylinder and the exhaust ports $p$ also opening to each cylinder. Secured to the engine block is an intake manifold $q$ which communicates with an intake passageway $r$ leading to each cylinder. Similarly, the exhaust passageway $s$ communicates with an exhaust manifold $t$ leading to each of the cylinders. This valve sleeve is secured in the hole $h$ by squeezing the same therein and also dowelling by means of the dowel pins $u$. The valve sleeve is made in two halves, and it is merely necessary to dowel in one half as the other half fits snugly therein, and there is very little chance for any play. These semi-sleeves are preferably shouldered as at $v$ and overlapped with each other and a clearance of a few thousandths is preferably provided between the halves to allow for unequal expansion of the sleeve and the cylinder head. The valve members are provided with the slots $x$ which extend part way around the periphery of the valve member and when these slots are in correct registration with the ports $o$ and $p$ and the passageways $r$ and $s$, the cylinders are placed in communication with the intake and with the exhaust manifolds respectively. Fig. 3 shows the position of the valve when the cylinder begins the intake stroke. Figs. 10 to 13 inclusive show the different positions of the valve as the engine successively sucks in the gas, compresses the same, fires the same and then exhausts the burnt gases.

I find it highly essential to provide some means whereby leakage is prevented longitudinally along the valve shaft member, and also around the shaft. I obtain this by fitting in a packing ring $y$ (see also Fig. 7) which is fitted into a groove 2 cut in the inside surface of the sleeve around the port openings. By making the sleeve in two halves as shown, these grooves in the inside are easily cut before assembly together in the engine. These packing rings are forced outwardly from the inner surface of the sleeve by the spring members 3 and bear against the rotating valve shaft. These packing rings will normally scrape off any carbon which might form on the valve shaft member and tend to maintain the shaft free from carbon, and also prevent leakage of gas and burnt gases along the shaft and around the shaft. A very long packing member 4 may be inserted in the sleeve at another point near the mouth of the intake and exhaust passageways $r$ and $s$ respectively, for providing additional means for preventing leakage around the shaft. An advantage of this construction is that one single valve member serves to control the passage of the gas through all the intake ports, and another single valve member controls the exhaust of the burnt gases. The groove in the valve shaft member is so positioned as to open said intake ports in correct timed relation with the stroke of the engine. Similarly, the valve member controlling the exhaust of the engine is timed and works in synchronism with the intake valve. Both of these valve members are actuated from off the crank shaft by means of the chain drive above described though obviously a train of gears could be used as the full equivalent.

What I claim is:

1. In an internal combustion engine, the combination of an engine block having a longitudinally extending tubular formation which is in communication with ports of each cylinder and ports leading outside the engine, a single two-part sleeve fitting within this tubular formation of the engine and having openings which align with the said ports, the interior of the sleeve being cut away around the openings communicating with the cylinder ports, a packing ring positioned within this cut away portion, a valve member within the sleeve having grooves which align with the openings in the sleeve and means for resiliently pressing the packing rings against the valve member to prevent leakage around the openings in the sleeve and longitudinally extending packing member in the sleeve positioned adjacent the openings communicating with the ports leading outside the engine.

2. In an internal combustion engine, the combination of an engine block having a longitudinally extending tubular formation which is in communication with ports of each cylinder and ports leading outside the engine, a two-part sleeve fitting within this tubular formation of the engine and having openings which align with the said ports, the interior of the sleeve being cut away around the openings, a packing ring positioned within this cut away portion, a valve member within the sleeve having grooves which align with the openings in the sleeve, and a second packing device between the sleeve and the valve member and extending longitudinally thereof.

In testimony whereof I have affixed my signature.

PETER STONE.